(12) United States Patent
Berendes et al.

(10) Patent No.: US 10,951,078 B2
(45) Date of Patent: Mar. 16, 2021

(54) ROTOR WITH COOLING

(71) Applicant: Dr. Ing. h.c. F. Porsche Aktiengesellschaft, Stuttgart (DE)

(72) Inventors: Philipp Berendes, Stuttgart (DE); Bernhard Wiedemann, Stuttgart (DE); Stefan Oechslen, Stuttgart (DE); Jan David Schmitz-Hübsch, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 253 days.

(21) Appl. No.: 16/177,893

(22) Filed: Nov. 1, 2018

(65) Prior Publication Data

US 2019/0181709 A1 Jun. 13, 2019

(30) Foreign Application Priority Data

Dec. 8, 2017 (DE) .......................... 10 2017 129 212.8

(51) Int. Cl.
*H02K 1/32* (2006.01)
*H02K 1/27* (2006.01)
(Continued)

(52) U.S. Cl.
CPC ............... *H02K 1/32* (2013.01); *H02K 1/276* (2013.01); *H02K 1/30* (2013.01); *H02K 7/04* (2013.01);
(Continued)

(58) Field of Classification Search
CPC .................................. H02K 1/32; H02K 1/276
See application file for complete search history.

(56) References Cited

U.S. PATENT DOCUMENTS 4,311,932 A * 1/1982 Olson ...................... H02K 9/19
310/59
4,513,218 A * 4/1985 Hansen .................. H02K 9/197
310/198
(Continued)

FOREIGN PATENT DOCUMENTS

CN 202475068 U 10/2012
CN 106104975 A 11/2016
(Continued)

OTHER PUBLICATIONS

Chinese Office Action for Chinese Application No. 201811456960.3, dated Jun. 18, 2020, 8 pages.
(Continued)

*Primary Examiner* — Robert W Horn
(74) *Attorney, Agent, or Firm* — RatnerPrestia

(57) ABSTRACT

A rotor for an electric motor has a shaft and a rotor laminated core connected to the shaft. A coolant duct is formed in the rotor in order to enable coolant to flow through the coolant duct. The coolant duct has a first portion, which runs at least in regions in the rotor laminated core. The rotor laminated core has a sleeve on the outer circumferential surface in order to avoid coolant escaping at the outer circumferential surface of the rotor laminated core. In a method for producing a rotor, a material having glass fibers or carbon fibers and a resin are applied to the rotor laminated core, and the resin is subsequently cured in order to produce the sleeve.

17 Claims, 5 Drawing Sheets

(51) Int. Cl.
*H02K 1/30* (2006.01)
*H02K 7/04* (2006.01)
*H02K 15/03* (2006.01)
*H02K 9/19* (2006.01)

(52) U.S. Cl.
CPC .......... *H02K 15/03* (2013.01); *H02K 1/2766* (2013.01); *H02K 9/19* (2013.01)

(56) References Cited

U.S. PATENT DOCUMENTS

| | | | | |
|---|---|---|---|---|
| 5,994,804 | A * | 11/1999 | Grennan | H02K 1/32 310/58 |
| 6,727,609 | B2 * | 4/2004 | Johnsen | H02K 1/32 310/52 |
| 7,514,827 | B2 * | 4/2009 | Hall | H02K 1/32 310/61 |
| 8,648,506 | B2 * | 2/2014 | Bradfield | H02K 1/30 310/61 |
| 8,684,643 | B2 * | 4/2014 | Schneider | B23Q 11/127 409/135 |
| 8,928,195 | B2 * | 1/2015 | Ohashi | H02K 7/088 310/54 |
| 10,038,355 | B2 * | 7/2018 | Brauer | H02K 9/20 |
| 10,326,334 | B2 * | 6/2019 | Larjola | F01K 13/00 |
| 10,673,306 | B2 * | 6/2020 | Handa | H02K 5/10 |
| 10,868,452 | B2 * | 12/2020 | Yamaguchi | H02K 1/276 |
| 2003/0230950 | A1 | 12/2003 | Reimann | |
| 2011/0273040 | A1 * | 11/2011 | Chamberlin | H02K 1/32 310/59 |
| 2012/0025642 | A1 * | 2/2012 | Onimaru | H02K 1/32 310/64 |
| 2012/0074801 | A1 * | 3/2012 | Brown | H02K 1/32 310/59 |
| 2013/0241326 | A1 * | 9/2013 | Pal | H02K 9/197 310/54 |
| 2013/0278091 | A1 * | 10/2013 | Ohashi | H02K 5/20 310/58 |
| 2013/0313928 | A1 | 11/2013 | McKinzie et al. | |
| 2014/0252893 | A1 * | 9/2014 | Veeh | H02K 9/197 310/54 |
| 2015/0280525 | A1 | 10/2015 | Rippel et al. | |
| 2017/0054344 | A1 * | 2/2017 | Larjola | F01K 13/00 |
| 2017/0310177 | A1 | 10/2017 | Shimoda et al. | |
| 2018/0337571 | A1 * | 11/2018 | Pal | H02K 1/32 |
| 2019/0013717 | A1 * | 1/2019 | Li | H02K 9/16 |
| 2019/0036403 | A1 * | 1/2019 | Umeda | F04D 29/181 |
| 2019/0115810 | A1 * | 4/2019 | Kinpara | B21D 28/02 |
| 2019/0181709 | A1 * | 6/2019 | Berendes | H02K 1/32 |
| 2020/0212744 | A1 * | 7/2020 | Ohzu | H02K 9/19 |
| 2020/0287432 | A1 * | 9/2020 | Tanaka | H02K 1/32 |
| 2020/0328641 | A1 * | 10/2020 | Dums | H02K 1/32 |
| 2020/0398871 | A1 * | 12/2020 | Kueter | B61D 17/02 |

FOREIGN PATENT DOCUMENTS

| | | |
|---|---|---|
| DE | 102007006986 B3 | 6/2008 |
| DE | 102011052085 A1 | 1/2013 |
| EP | 0461905 A2 | 12/1991 |
| EP | 2658099 A1 | 10/2013 |
| GB | 951378 | 3/1964 |
| JP | 56110459 A | 9/1981 |
| JP | 6087643 A | 5/1985 |
| JP | 11146583 A | 5/1999 |
| JP | 2001190047 A | 7/2001 |
| JP | 2008131718 A | 6/2008 |
| JP | 2012165620 A | 8/2012 |
| JP | 2015091202 A | 5/2015 |
| WO | 2015132462 A2 | 9/2015 |

OTHER PUBLICATIONS

German Examination Report for German Application No. 10 2017 129 212.8, dated Jul. 24, 2018, with partial translation—9 pages.
Japanese Office Action for Japanese Application No. 2018-221011, dated Nov. 13, 2019, 3 pages.

* cited by examiner

ROTOR WITH COOLING

CROSS-REFERENCE TO RELATED APPLICATION

This application claims priority to German Patent Application No. DE 10 2017 129 212.8, filed Dec. 8, 2017, the contents of such application being incorporated by reference herein in their entirety.

FIELD OF THE INVENTION

The invention relates to a rotor with cooling for an electric motor, and to a method for producing such a rotor.

BACKGROUND OF THE INVENTION

US 2013/0313928 A1, which is incorporated by reference herein, shows an electric motor with a cooling duct which extends from the shaft of an internal rotor outward via the cooling duct into the region of the air gap and of the external stator and is guided back from the external stator via a connection of the external stator housing in order to form a cooling circuit.

EP 0 461 905 A2, which is incorporated by reference herein, shows an internal rotor motor with a cooling duct, in which the coolant is supplied and removed via a rotary coupling at a shaft end.

DE 10 2011 052 085 A1, which is incorporated by reference herein, shows an electric motor with an internal rotor, in which the shaft has a fluid inlet and a fluid outlet on an axial side.

DE 10 2007 006 986 B3, which is incorporated by reference herein, shows an internal rotor with a basic body, a laminated core and magnets attached on the outer side of the laminated core. A binding made of carbon fiber reinforced plastic is attached around the magnets.

US 2003/0230950 A1, which is incorporated by reference herein, shows an electric motor with an external stator and an internal rotor, wherein a sleeve is fastened to the inner side of the outer stator in order to bring about isolation.

EP 2 658 099 A1, which is incorporated by reference herein, shows an electric motor with an external stator and an internal rotor. The internal rotor has a shaft and a laminated core, and a sleeve is provided between the shaft and the laminated core and bounds a coolant duct of the shaft.

SUMMARY OF THE INVENTION

A rotor for an electric motor has a shaft and a rotor laminated core connected to the shaft, and in said rotor a coolant duct is formed, in order to enable coolant to flow through the coolant duct. The coolant duct has a first portion, which runs at least in regions in the rotor laminated core, and the rotor laminated core has a sleeve on the outer circumferential surface in order to avoid coolant escaping at the outer circumferential surface of the rotor laminated core.

By means of the sleeve, leakage of the rotor in the region of the outer circumferential surface can be reduced or prevented. The rotor laminated core is fundamentally suitable for the formation of ducts but, depending on the tolerances and environmental conditions, this may lead to an undesirable flow of coolant into the region between the rotor laminations. Leakage in the region of the outer circumferential surface can be counteracted by the sleeve.

According to a preferred embodiment, the rotor is designed as an internal rotor and the stator as an external stator. The arrangement of the coolant ducts is straightforward in the case of an internal rotor.

According to a preferred embodiment, the sleeve fluidically seals the rotor at the outer circumferential surface. Sealing particularly readily prevents leakage at the outer circumferential surface.

According to a preferred embodiment, the sleeve is formed from a glass-fiber composite material or from a carbon-fiber composite material. A glass-fiber composite material is customarily non-electrical and is therefore well-suited in the region of changing magnetic fields. The two materials mentioned have good mechanical properties.

According to a preferred embodiment, an adhesive connection is provided between the sleeve and the rotor laminated core. By this means, a flow of coolant on the outer circumferential surface in the axial direction is better prevented and/or the sleeve can be held in position and stabilized by the action of centrifugal force.

According to a preferred embodiment, the rotor has a coolant inlet and a coolant outlet, wherein the coolant inlet and the coolant outlet are formed on the same axial side of the rotor. The formation on the same axial side facilitates the supply and removal of coolant and leaves the other axial side free for the output.

According to a preferred embodiment, the rotor has magnets, and pockets in which the magnets are arranged are provided in the rotor laminated core. By means of such a configuration, the magnets can already be held by the rotor laminated core.

The recesses in the rotor laminated core, which serve for orienting the magnetic flux, can be used as cooling ducts. If required, cooling ducts can alternatively or additionally be provided in another region of the rotor laminated core.

According to a preferred embodiment, the coolant duct has a second portion, which second portion runs in regions in the shaft. The use of the shaft for the coolant duct reduces the number of recesses in the rotor laminated core and leads to greater stability.

According to a preferred embodiment, the sleeve is formed from a material which is electrically non-conductive and magnetically non-conductive. This reduces the risk of eddy currents and losses in the changing magnetic fluxes.

According to a preferred embodiment, a first balancing disk is provided on a first axial side of the rotor laminated core, wherein the coolant duct has a third portion, which third portion extends through the first balancing disk. The use of the balancing disk for a portion of the coolant duct permits a simple geometry of the coolant duct in the laminated core, and no additional components are required.

According to a preferred embodiment, the sleeve extends in the axial direction as far as into the region of the first balancing disk. This also enables an improvement of the sealing in the region between the rotor laminated core and the balancing disk.

According to a preferred embodiment, the sleeve also extends in the axial direction as far as into the region of the second balancing disk. This enables an improvement of the sealing in the region between the rotor laminated core and the balancing disk.

According to a preferred embodiment, a second balancing disk is provided on the second axial side of the rotor laminated core opposite the first axial side thereof, wherein the coolant duct has a fourth portion, which fourth portion extends through the second balancing disk.

An electric motor has a stator and a corresponding rotor.

A method for producing a rotor has the following step:

a material having glass fibers or carbon fibers and a resin are applied to the rotor laminated core, and the resin is subsequently cured in order to produce the sleeve.

The production of the sleeve on the rotor laminated core leads to a better connection between the sleeve and the rotor laminated core.

According to a preferred embodiment, first of all the material having glass fibers or carbon fibers is applied, and the material having glass fibers or carbon fibers is subsequently impregnated with the resin. The material having glass fibers or carbon fibers can be processed better before the resin is applied, in particular can be braided or wound better.

According to a preferred embodiment, the material having glass fibers or carbon fibers is wound or braided onto the rotor laminated core. This results in a stable structure.

According to a preferred embodiment, the material having glass fibers or carbon fibers and the resin are applied together as pre-impregnated material. This permits straightforward production and a lower outlay on machinery.

Although glass fibers and carbon fibers are mentioned, in a preferred embodiment any desired fibers may be used.

BRIEF DESCRIPTION OF THE DRAWING FIGURES

Further details and advantageous refinements of the invention will emerge from the exemplary embodiments described below and illustrated in the drawings, which embodiments should in no way be understood as restricting the invention, and also from the dependent claims. In the figures:

DETAILED DESCRIPTION OF THE INVENTION

Figure 1:
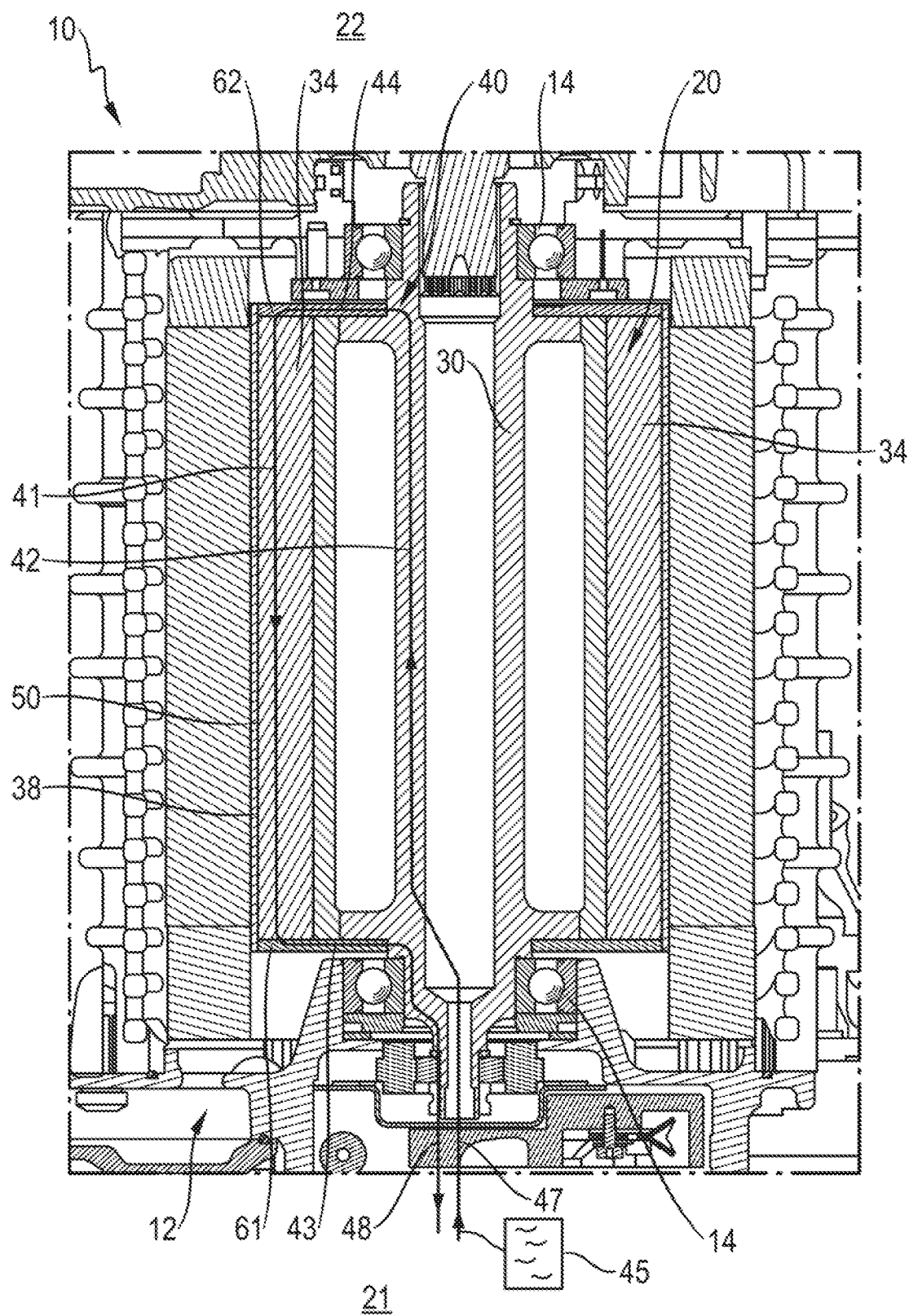
FIG. 1 shows an electric motor with a cooled rotor in a longitudinal section.

FIG. 1 shows an electric motor 10 with a stator 12 and a rotor 20. The rotor 20 is designed as an internal rotor and the stator 12 as an external stator. However, it is likewise possible to design the rotor as an external rotor and the stator as an external stator. The rotor 20 has a shaft 30 and a rotor laminated core 34 connected to the shaft 30. In the rotor 20 a coolant duct 40 is formed, in order to enable coolant to flow through the coolant duct 40. By this means, cooling of the rotor 20 is possible, and this is advantageous in particular in the case of powerful electric motors, as are used for driving electric vehicles. The coolant duct 40 has a coolant inlet 47, a coolant outlet 48, a portion 42, which runs in regions or completely in the shaft 30, and a portion 41 which runs at least in regions in the rotor laminated core 34.

The rotor laminated core 34 has a sleeve 50 on the outer circumferential surface 38, which sleeve 50 is provided in the magnetic air gap 39 of the electric motor 10. The magnetic air gap 39 is the magnetically poorly conducting region or non-conducting region between the stator 12 and the rotor 20.

A first balancing disk 61 is provided on a first axial side 21 of the rotor laminated core 34, and a second balancing disk 62 is provided on the second axial side 22 of the rotor laminated core 34 opposite the first axial side 21. The coolant duct 40 preferably has a third portion 43, which extends through the first balancing disk 61, and a fourth portion 44, which extends through the second balancing disk 62.

The sleeve 50 preferably extends in the axial direction as far as into the region of the first balancing disk 61 and/or the second balancing disk 62. This also permits sealing in the transition region between the rotor laminated core 34 and the balancing disks 61, 62.

In the exemplary embodiment, a bearing arrangement 14 is provided in the form of two rolling bearings in order to permit a rotational mounting of the rotor 20 in the stator 12.

The sleeve 50 fluidically seals the rotor 20, preferably at the outer circumferential surface 38. Although the coolant duct 40 runs in the portion 41 in the interior of the rotor laminated core 34, for example in a bore, coolant 45 may nevertheless escape out of the coolant duct 40 in between two adjacent laminations of the rotor laminated core 34. By means of the sleeve 50, an escape of the coolant 45 at the outer circumferential surface 38 can be reduced or avoided.

The sleeve 50 is preferably formed from a glass-fiber composite material, i.e. from a material which has glass fibers. The glass-fiber composite material preferably additionally has a resin, in order to permit good tightness.

There is particularly preferably an adhesive connection between the sleeve 50 and the rotor laminated core 34. Such an adhesive connection can be achieved, for example, by a glass-fiber composite material being cured with a resin on the rotor laminated core 34. This gives rise to an adhesive connection with chemical adhesion between the rotor laminated core 34 and the sleeve 50.

The sleeve 50 is preferably formed from a material which is electrically non-conductive and magnetically non-conductive. The formation of eddy currents in the sleeve 50 is thereby reduced or completely avoided.

Figure 2:
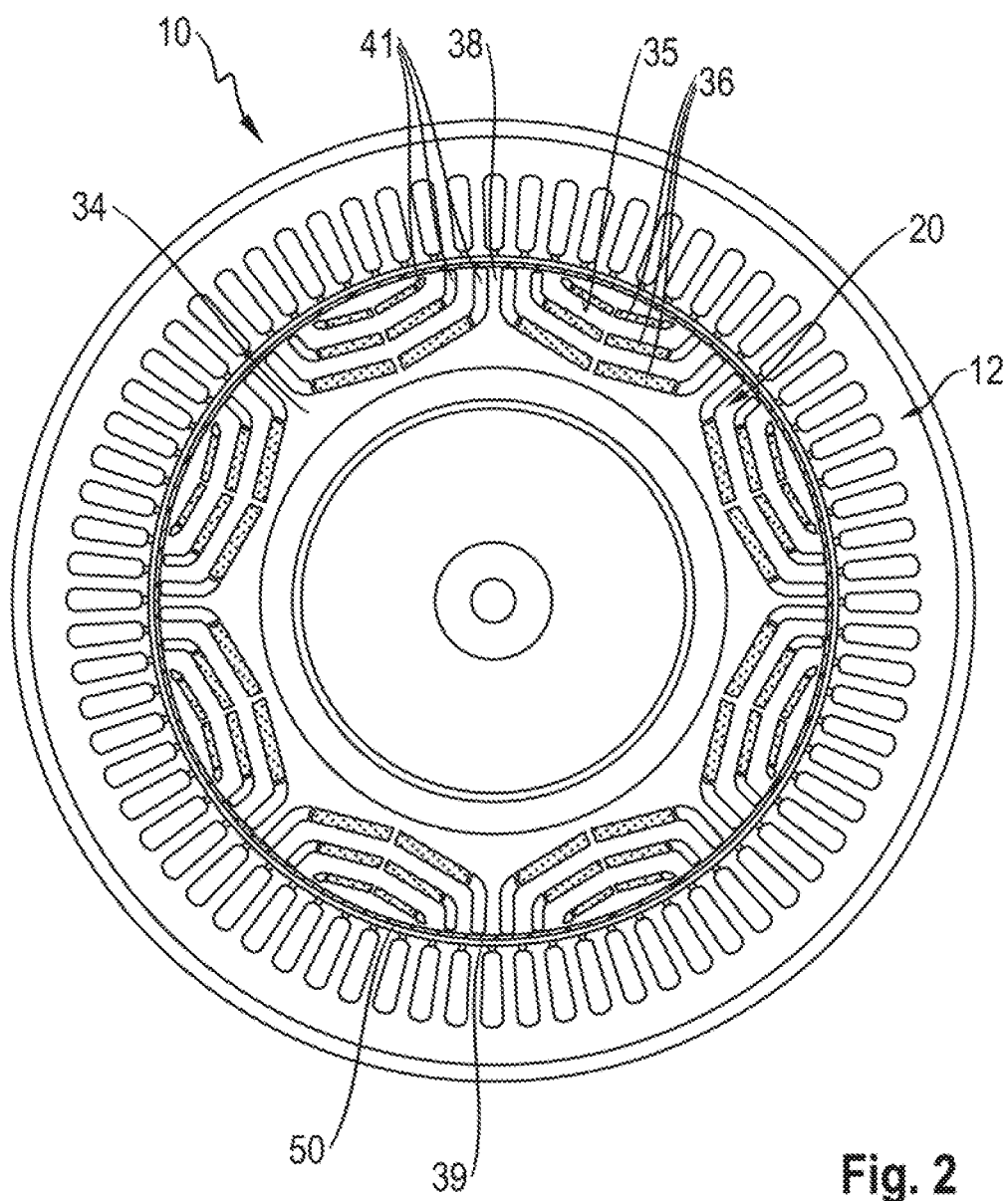
FIG. 2 shows a cross section through the electric motor of FIG. 1.

FIG. 2 shows the electric motor 10 with the stator 12 and the rotor 20 in cross section. In the exemplary embodiment, pockets 35 are provided for magnets 36, and portions 41 of a plurality of coolant ducts 40 are provided, which portions, in the exemplary embodiment, are arranged laterally on the magnets 36 and extend through the rotor laminated core 34. The portions 41 of the coolant ducts 40 preferably run in the axial direction through the rotor laminated core 34, but can also run differently, for example with a curvature.

Figure 3:
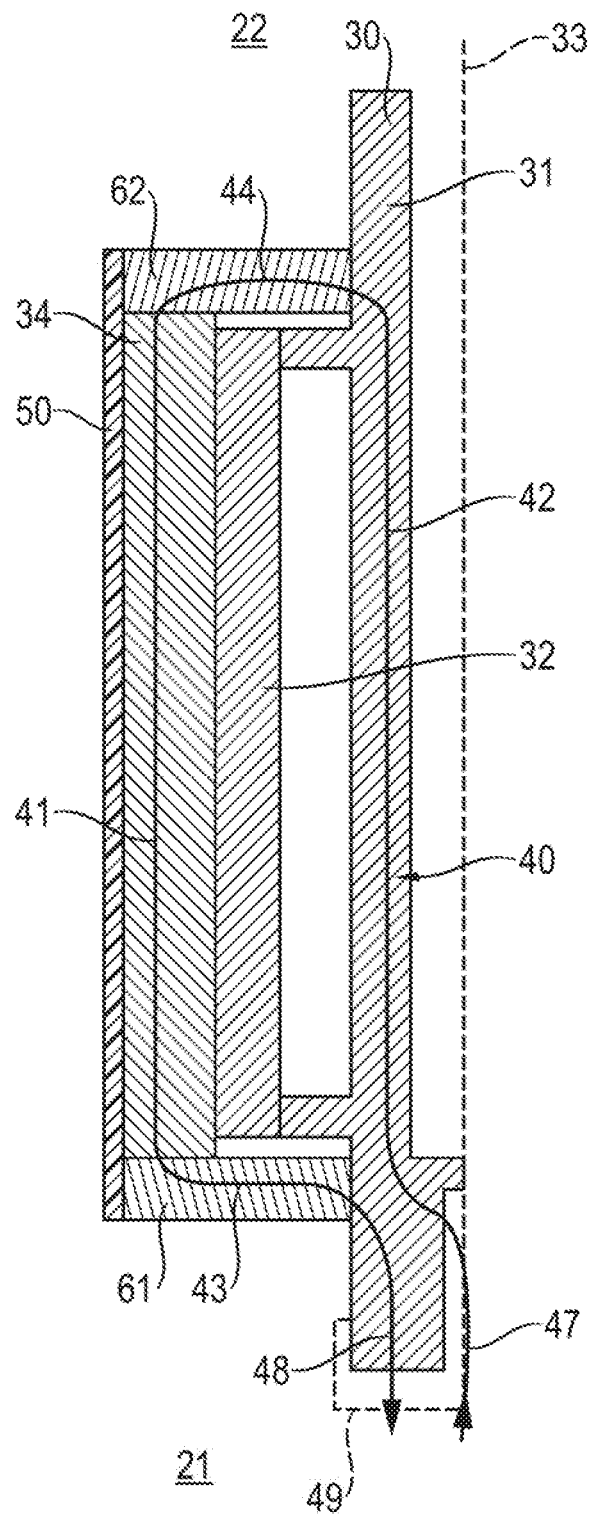
FIG. 3 shows the schematic construction of the rotor from FIG. 1 in a longitudinal section.

FIG. 3 shows the schematic construction of the rotor 20 in a longitudinal section. Only the side on the left of the axis of rotation 31 is shown.

In the exemplary embodiment, the shaft 30 is formed in two parts with an inner first shaft part 31 and an outer second shaft part 32. This facilitates the formation of the portion 42 of the coolant duct 40 in the shaft 30.

A rotational coupling 49 is provided on the shaft 30 on the first axial side 21 in order to permit a fluid connection to the coolant inlet 47 and coolant outlet 48.

The output can take place at the shaft 30 on the second axial side 22.

Figure 4:
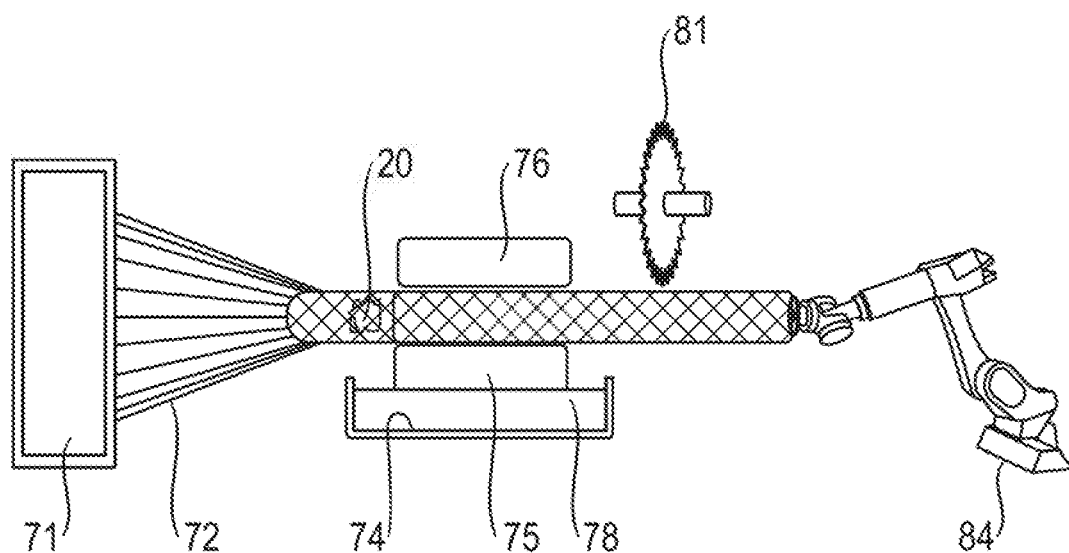
FIG. 4 shows a schematic illustration of a method for producing the rotor from FIG. 1.

FIG. 4 shows a braiding machine 71 which applies a material 72 having glass fibers to the rotor 20, preferably in braided form. A trough 74 with a resin 78 is provided, and the resin 78 is applied to the material 72 having glass fibers by two rollers 75, 76. This is referred to as impregnation of the material 72 having glass fibers.

A separating device 81 is provided in order to separate the impregnated material 72 having glass fibers.

The rotor 20 can subsequently be removed, for example by a robot 84, and cured.

Figure 5:
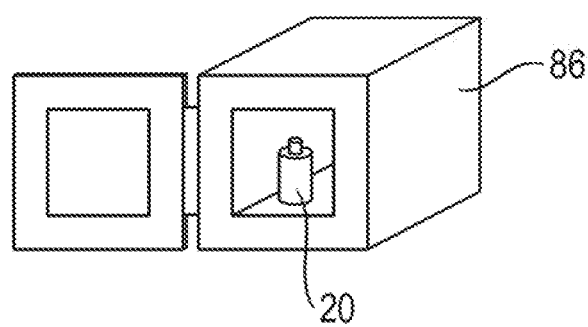
FIG. 5 shows a chamber for curing of the rotor from FIG. 1.

FIG. 5 shows a chamber 86 for curing the impregnated material 72 having glass fibers. The rotor 20 is positioned in the chamber 86 and subsequently subjected to increased temperature and increased pressure in order to bring about curing of the resin 78 and therefore to produce the fiber composite material of the sleeve 50.

Figure 6:
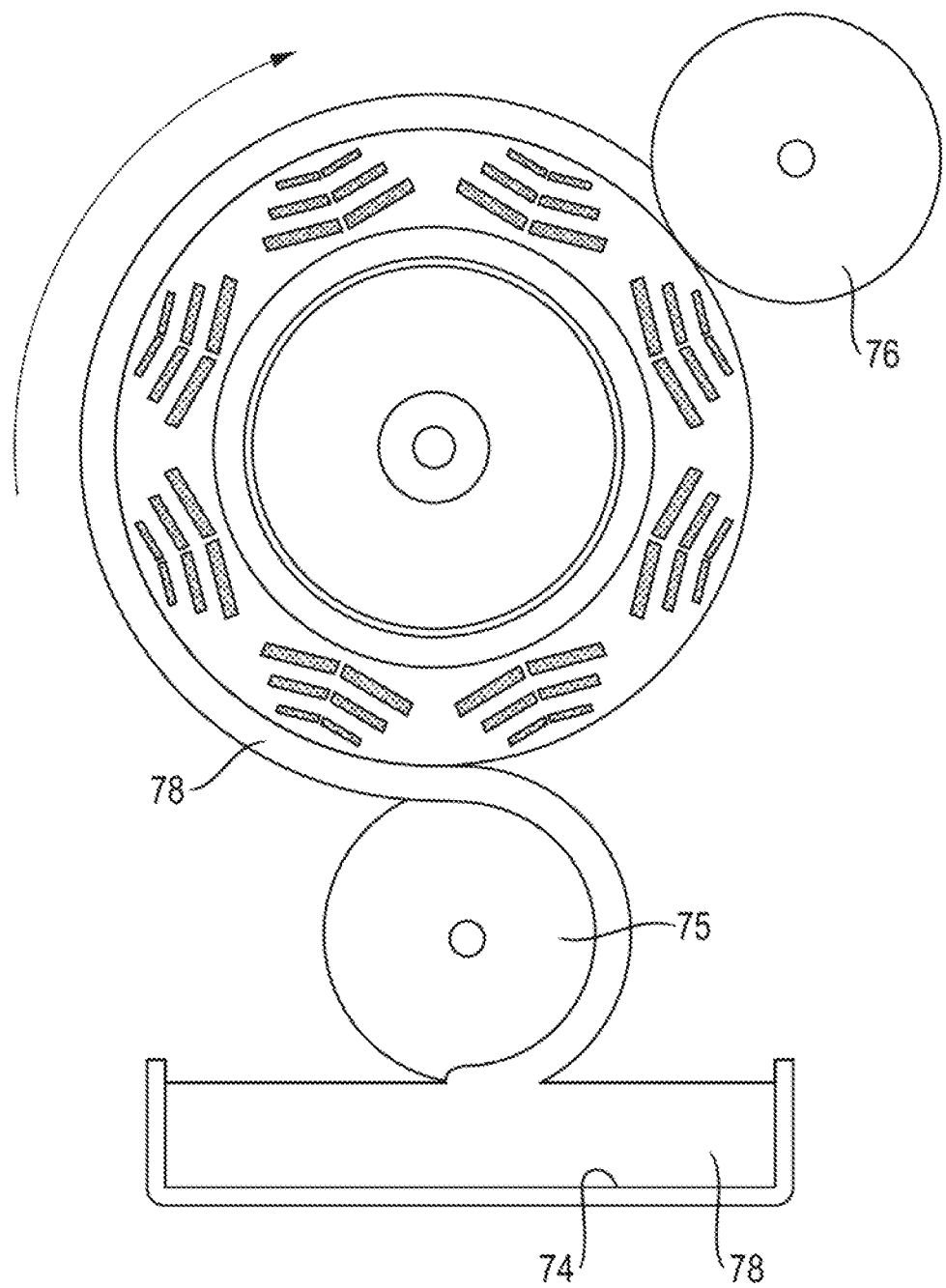
FIG. 6 shows a schematic illustration of a device for applying a resin during the production of a rotor from FIG. 1.

FIG. 6 shows a cross section through the trough 74 with the rollers 75, 76 for applying the resin. The application takes place by rotation of the rotor 20.

There are a number of possibilities for producing the rotor. A preferred method has the following step:

the material 72 having glass fibers and the resin 78 are applied to the rotor laminated to core 34, and the resin 78 is subsequently cured in order to produce the sleeve.

Preferably, first of all the material 78 having glass fibers is applied, and the material 72 having glass fibers is subsequently impregnated with the resin 78. In particular, braiding of the material 72 having glass fibers is more simply possible without the resin 78.

The material 78 having glass fibers is preferably wound or braided onto the rotor laminated core 34. This results in a stable structure.

The material 72 having glass fibers and the resin 78 are preferably applied together as pre-impregnated material 72, 78. Such pre-impregnated materials 72, 78 are also referred to as prepregs or as preimpregnated fibers.

The methods mentioned have the advantage that an adhesive connection can arise between the sleeve 50 and the rotor laminated core. By this means, a flow of coolant at the outer circumferential surface 38 of the rotor laminated core 34 is reduced or, preferably, prevented.

Various variations and modifications are of course possible within the scope of the present invention.

In addition to rotor cooling, stator cooling can also be carried out, as is indicated in FIG. 1 with the ducts.

What is claimed is:

1. A rotor for an electric motor, the rotor comprising:
a shaft,
a rotor laminated core connected to the shaft,
a coolant duct formed in the rotor through which coolant flows, the coolant duct having a first portion which runs at least partially within the rotor laminated core, and
a sleeve on an outer circumferential surface of the rotor laminated core that is configured to limit coolant from escaping at the outer circumferential surface,
wherein the rotor laminated core is positioned radially outward of and surrounds the shaft, and that the coolant duct extends continuously through the rotor laminated core at a location that is also radially outward of the shaft.

2. The rotor as claimed in claim 1, wherein the sleeve fluidically seals the rotor on the outer circumferential surface.

3. The rotor as claimed in claim 1, wherein the sleeve is formed from a glass-fiber composite material or from a carbon-fiber composite material.

4. The rotor as claimed in claim 1, further comprising an adhesive connection between the sleeve and the rotor laminated core.

5. The rotor as claimed in claim 1, further comprising a coolant inlet and a coolant outlet, wherein the coolant inlet and the coolant outlet are formed on a same axial side of the rotor.

6. The rotor as claimed in claim 1, further comprising magnets and pockets in which the magnets are arranged, the pockets being disposed in the rotor laminated core.

7. The rotor as claimed in claim 1, wherein the coolant duct has a second portion that runs at least partially within the shaft.

8. The rotor as claimed in claim 1, wherein the sleeve is formed from a material which is electrically non-conductive and magnetically non-conductive.

9. The rotor as claimed in claim 1, further comprising a first balancing disk disposed on a first axial side of the rotor laminated core, wherein the coolant duct has a third portion that extends through the first balancing disk.

10. The rotor as claimed in claim 9, wherein the sleeve extends in an axial direction at least partially into a region of the first balancing disk.

11. The rotor as claimed in claim 10, further comprising a second balancing disk, wherein the sleeve extends in an axial direction at least partially into a region of the first balancing disk and at least partially into a region of the second balancing disk.

12. The rotor as claimed in claim 10, further comprising a second balancing disk disposed on a second axial side of the rotor laminated core opposite the first axial side thereof, wherein the coolant duct has a fourth portion that extends through the second balancing disk.

13. An electric motor which has a stator and the rotor as claimed in claim 1.

14. The rotor as claimed in claim 6, wherein the pockets, which receive the magnets, are connected to the coolant duct bores.

15. The rotor as claimed in claim 1, wherein the coolant duct includes a longitudinal portion that extends through the rotor laminated core and a transverse portion that extends between the rotor laminated core and the shaft.

16. The rotor as claimed in claim 1, wherein the shaft includes a hollow central portion through which coolant can flow.

17. The rotor as claimed in claim 1, further comprising an annular air gap disposed between the rotor laminated core and the shaft.

* * * * *